(12) United States Patent
Akashi et al.

(10) Patent No.: US 7,391,199 B2
(45) Date of Patent: Jun. 24, 2008

(54) DC-DC CONVERTER

(75) Inventors: Hiroki Akashi, Osaka (JP); Takashi Ryu, Kyoto (JP); Takuya Ishii, Osaka (JP); Mikio Motomori, Osaka (JP); Hirohisa Tanabe, Kyoto (JP); Makoto Ishimaru, Osaka (JP); Tomoya Shigemi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/489,184

(22) Filed: Jul. 19, 2006

(65) Prior Publication Data

US 2007/0018628 A1    Jan. 25, 2007

(30) Foreign Application Priority Data

Jul. 20, 2005    (JP) .............................. 2005-209575

(51) Int. Cl.
*G05F 1/575* (2006.01)
*G05F 1/618* (2006.01)

(52) U.S. Cl. ....................... 323/285; 323/284

(58) Field of Classification Search ......... 323/222–225, 323/271, 282–285, 351
See application file for complete search history.

(56) References Cited

U.S. PATENT DOCUMENTS

| | | | | |
|---|---|---|---|---|
| 6,307,356 | B1* | 10/2001 | Dwelley | 323/282 |
| 6,476,589 | B2* | 11/2002 | Umminger et al. | 323/282 |
| 6,541,947 | B1* | 4/2003 | Dittmer et al. | 323/284 |
| 7,061,218 | B2* | 6/2006 | Ito | 323/351 |
| 7,250,746 | B2* | 7/2007 | Oswald et al. | 323/284 |

FOREIGN PATENT DOCUMENTS

| | | |
|---|---|---|
| JP | 2001-136737 | 5/2001 |
| WO | WO-00/79682 | 12/2000 |

\* cited by examiner

*Primary Examiner*—Gary L Laxton
(74) *Attorney, Agent, or Firm*—Harness, Dickey & Pierce, PLC (57) ABSTRACT

In a DC-DC converter conforming to the current mode control system, in which the valley value of an inductor current is controlled for output control, a current detection circuit 6 is configured to detect the current flowing from a low-side FET 2 to an inductor 3 using an FET 60, an NPN transistor 61, an NPN transistor 62, a PNP transistor 64, a PNP transistor 65 and a resistor 66, to detect the current flowing from the inductor 3 to the low-side FET 2 using an FET 67, a differential amplifier 68, an FET 69 and the resistor 66, and to output a current detection signal Vc.

11 Claims, 5 Drawing Sheets

DC-DC CONVERTER

FIELD OF THE INVENTION

The present invention relates to a DC-DC converter that supplies a controlled DC voltage to a variety of electronic apparatuses, and more particularly, to a DC-DC converter that controls DC power to be supplied to a load by controlling the valley value of an inductor current while periodically increasing/decreasing the inductor current by switching operation.

BACKGROUND OF THE INVENTION

In recent years, DC-DC converters have been used frequently in power supplies for the CPUs of personal computers and other power supplies. For example, a step-down DC-DC converter, supplying a DC voltage controlled so as to be lower than its power supply voltage to a load, comprises an inductor, and a high-side FET and a low-side FET connected in series between the power supply voltage and the ground voltage. These high-side and low-side FETs repeat ON/OFF operations alternately. As a result, the inductor repeats the storage and release of magnetic energy. The AC voltage generated when the storage and release are repeated in the inductor as described above is rectified, and a predetermined voltage is supplied to the load. The voltage supplied to the load is adjusted according to the ratio of the ON time in one period of the switching operation of the high-side FET. The inductor current has a triangular wave shape in which the current value increases/decreases repeatedly depending on the ON/OFF switching operation. In the current mode control system, the ON time or the OFF time of the high-side FET is usually controlled by controlling the peak value or the valley value of the current.

In the peak value control system in which the ON time is controlled, it is necessary to detect the current flowing through the high-side FET on the power supply voltage side. Hence, a detector and its peripheral circuit are provided on the power supply voltage side. As a result, the circuit configuration for carrying out accurate current detection in the case that the power supply voltage is assumed to fluctuate inevitably tends to become complicated.

On the other hand, in the valley value control system in which the OFF time is controlled, the current flowing through the low-side FET on the ground side is detected. Hence, a detector and its peripheral circuit are provided on the ground side, and the circuit configuration can be simplified.

Furthermore, because the output voltage tends to become lower recently, the ON time of the high-side FET tends to become shorter. In the peak value control system in which the ON time is controlled, detection and control must be carried out in a short time during which the high-side FET is ON. On the other hand, in the valley value control system in which the OFF time is controlled, detection and control should only be carried out in a time during which the high-side FET is OFF. The control time can thus be made longer. For the above-mentioned reasons, such a valley value control system as disclosed in Japanese Patent Application Laid-Open No. 2001-136737 has been proposed.

As an example of the valley value control system in which the OFF time of the high-side FET is controlled, the control system disclosed in Japanese Patent Application Laid-Open No. 2001-136737 will be described below referring to FIG. 6.

Figure 6:
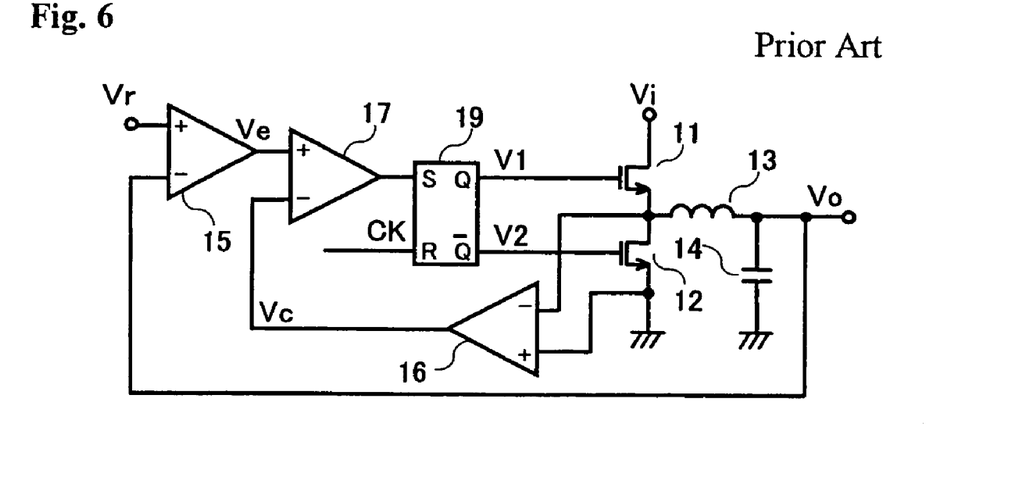
FIG. 6 is the circuit diagram showing the configuration of the conventional DC-DC converter.

FIG. 6 is a circuit diagram of a conventional step-down DC-DC converter. The DC-DC converter shown in FIG. 6 comprises a high-side FET 11, a low-side FET 12, an inductor 13, an output capacitor 14, an error amplifier 15, a current detector 16, a comparator 17, a timer circuit 18, and an RS latch 19. This conventional DC-DC converter is configured so that a voltage Vi is applied to the input terminal and so that a voltage Vo is supplied from the output terminal to a load. In FIG. 6, Vr designates a reference voltage.

The high-side FET 11 and the low-side FET 12, serving as switching devices, are connected in series between the input voltage Vi and the ground potential. The inductor 13 and the output capacitor 14 are connected between the connection point of the switching devices and the output terminal Vo so as to form a filter. The high-side FET 11 and the low-side FET 12 are connected to the RS latch 19 so as to respectively turn ON/OFF complementarily. The reference voltage Vr is input to the noninverting input terminal (+) of the error amplifier 15, the output voltage Vo is input to the inverting input terminal (−) thereof, and the error amplifier 15 outputs an error signal Ve to the noninverting input terminal (+) of the comparator 17. The error signal Ve is input to the noninverting input terminal of the comparator 17, and the comparator 17 outputs a set signal S for setting the RS latch 19. The current detector 16 detects the current flowing to the inductor 13 via the low-side FET 12 when the low-side FET 12 is ON. The current detector 16 detects and amplifies the voltage drop due to the ON resistance of the low-side FET 12, and generates and outputs a voltage-converted current detection signal Vc. This current detection signal Vc is applied to the inverting input terminal (−) of the comparator 17. An external clock signal CK is input to the reset input terminal of the RS latch 19.

Next, the basic operations of the conventional DC-DC converter shown in FIG. 6 will be described below.

When the high-side FET 11 is ON, the voltage difference (Vi−Vo) between the input voltage Vi and the output voltage Vo is applied to the inductor 13. At this time, the current IL flowing through the inductor 13 increases linearly, and magnetic energy is stored in the inductor 13. When the high-side FET 11 is OFF, the output voltage Vo is applied to the inductor 13 in the opposite direction. At this time, the inductor current IL decreases linearly, and the inductor 13 releases the magnetic energy. The inductor current IL is smoothened using the output capacitor 14, and a smoothened DC current is supplied to the output terminal. The output voltage Vo is fed back to the inverting input terminal (−) of the error amplifier 15, and the reference voltage Vr is input to the noninverting input terminal (+) of the error amplifier 15. The error signal Ve being output from the error amplifier 15 is input to the noninverting input terminal (+) of the comparator 17. The current detection signal Vc obtained by subjecting the current flowing through the low-side FET 12 to current-voltage conversion is input to the inverting input terminal (−) of the comparator 17. When the inductor current IL decreases, and when the current detection signal Vc lowers to the error signal Ve being output from the error amplifier 15, the output of the comparator 17 is inverted. In other words, the set signal S of the RS latch 19 becomes high, and the high-side FET-11 is turned ON. Then, the inductor 13 is begun to be charged. The clock signal CK is input to the reset input terminal of the RS latch 19, and the high-side FET 11 is turned OFF after a predetermined time has passed.

In the conventional DC-DC converter configured as described above, the high-side FET 11 and the low-side FET 12 are turned ON/OFF complementarily using the signals of the error amplifier 15, the comparator 17 and the RS latch 19, and the predetermined DC output voltage Vo is output.

The above-mentioned operations are the basic operations of the respective components of the conventional DC-DC converter. Operations when the load changes abruptly will be described below.

For example, when the output voltage Vo becomes lower than a target value because of the increase in the output current Io from the output terminal, the error amplifier 15 detects the lowering of the output voltage Vo and raises the error signal Ve. At this time, the time during which the current detection signal Vc of the low-side FET 12 lowers and reaches the error signal Ve, that is, the OFF time of the high-side FET 11, becomes shorter. As a result, the power supplied to the output capacitor 14 increases, and the output voltage Vo having been lowered rises.

In the opposite case, that is, when the output voltage Vo rises because of the decrease in the output current Io, the error amplifier 15 lowers the error signal Ve. At this time, the time during which the current detection signal Vc of the low-side FET 12 reaches the error signal Ve, that is, the OFF time of the high-side FET 11, becomes longer. As a result, the power supplied to the output capacitor 14 decreases, and the output voltage Vo having increased lowers.

As described above, when the load changes abruptly, the conventional DC-DC converter shown in FIG. 6 operates so that the output voltage Vo is maintained at a predetermined value.

Figure 7:
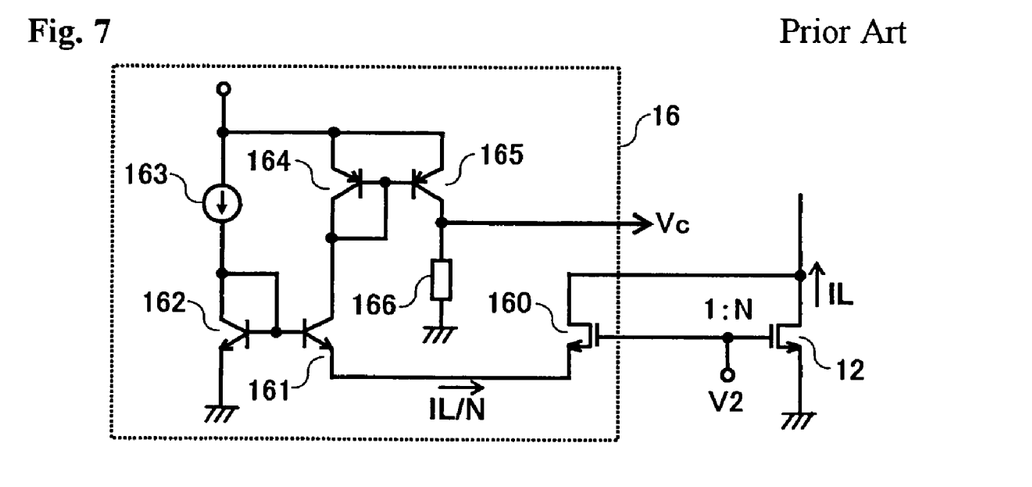
FIG. 7 is the circuit diagram showing the configuration of the current detection circuit of the conventional DC-DC converter.

FIG. 7 is a circuit diagram showing a circuit example of the current detector 16 that detects the current of the low-side FET 12 in the DC-DC converter shown in FIG. 6, specifically configured using a conventional technology. Because the voltage at the drain of the low-side FET 12, that is, the voltage at the current detection point, is negative, it is difficult to directly detect and amplify the voltage. Hence, as shown in FIG. 7, the current detector 16 comprises an FET 160, which is an N-channel FET being the same as the low-side FET 12, and the drain and the gate of which are common to those of the low-side FET 12, respectively; an NPN transistor 161, the emitter of which is connected to the source of this FET 160; an NPN transistor 162, the collector and the base of which are connected to the base of this NPN transistor 161 so as to form a mirror structure, and the emitter of which is connected to the source of the low-side FET 12; a current source 163 that supplies a current to this NPN transistor 162; a PNP transistor 164 and a PNP transistor 165 connected so as to form a mirror circuit, which is connected to the collector of the NPN transistor 161 and in which a current being equal to the current flowing through the NPN transistor 161 flows; and a resistor 166 that converts the current flowing through the PNP transistor 165 into a voltage. The size of the FET 160 is 1/n of that of the low-side FET 12, that is, the ON resistance of the FET 160 is n times that of the low-side FET 12. The mirror ratio is set so that the current flowing through the PNP transistor 165 is equal to the current flowing through the NPN transistor 161. The resistance value of the resistor 166 is Rs.

The potential at the source of the FET 160 and the emitter of the NPN transistor 161 becomes equal to the potential at the source of the low-side FET 12 because the NPN transistor 161 and the NPN transistor 162 form a mirror circuit. Hence, the voltage across the source and the drain of the FET 160 becomes equal to the voltage across the source and the drain of the low-side FET 12. In addition, because the ON resistance of the FET 160 is n times the ON resistance of the low-side FET 12, when it is assumed that the current flowing through the low-side FET 12 is IL when the low-side FET 12 is ON, the current flowing through the FET 160 is IL/n. This current IL/n flows through the resistor 166 via the NPN transistor 161, the PNP transistor 164 and the PNP transistor 165.

As a result, a voltage $Vc=Rs \times IL/n$ is generated across the terminals of the resistor 166. In other words, the current IL that flows through the low-side FET 12 when the low-side FET 12 is ON can be detected according to the voltage across the terminals of the resistor 166.

However, in the DC-DC converter conforming to the conventional valley value control system, only the current flowing from the source to the drain of the low-side FET 12 when the low-side FET 12 is ON can be detected in the configuration of the current detector 16 shown in FIG. 7 and described above. Hence, in the DC-DC converter conforming to the conventional valley value control system, the low-side FET 12 is turned OFF when the valley value of the inductor current reaches zero. Because the ON time Ton of the high-side FET 11 in the DC-DC converter is constant, there is a problem that the output voltage Vo rises, exceeding the target value. Hence, it is necessary to carry out intermittent operation in which the high-side FET 11 is not turned ON for a predetermined time after the low-side FET 12 was turned OFF. In other words, in the case that, because the load becomes light, the valley value of the inductor current reaches zero, and the output voltage Vo exceeds the target value, the OFF state of the high-side FET 11 is maintained. When it is detected that the output voltage Vo has lowered to the target value, the high-side FET 11 is turned ON. This kind of intermittent operation has a problem that, as the load becomes lighter, the output voltage Vo rises higher owing to the charging of the output capacitor 14. Hence, as the load is lighter, the output ripple voltage that is superimposed on the output voltage Vo becomes larger, and the output ripple voltage is added to the target value. As a result, an error occurs between the output voltage Vo and the target value.

SUMMARY OF THE INVENTION

The present invention is intended to provide a DC-DC converter conforming to the current mode control system, in which the valley value of an inductor current is controlled for output control, that is, the OFF time of a switching device is controlled, and more particularly, to provide a DC-DC converter capable of carrying out control even when the valley value of the inductor current is lower than zero and capable of accurately controlling the output voltage.

For the purpose of attaining the above-mentioned object, a DC-DC converter according to a first aspect of the present invention comprises:

- a high-side switch connected to the power supply voltage side,
- a low-side switch being used for rectification and connected to the ground side,
- an inductor, one terminal of which is connected to the connection point of the high-side switch and the low-side switch connected in series,
- an output filter, one terminal of which is connected to the other terminal of the inductor, and the other terminal of which is grounded, and
- a current detection circuit that detects the current flowing through the low-side switch, wherein
- the DC-DC converter is configured to adjust the current flowing through the low-side switch and to control the output voltage being output from the output filter by turning ON/OFF the high-side switch and the low-side switch, and
- the current detection circuit is configured to detect both the bidirectional currents flowing through the low-side switch when the low-side switch is ON.

The DC-DC converter according to the present invention, configured as described above, can detect and control both the bidirectional currents flowing through the low-side switch, and can operate continuously in the whole load range from full load to no load without carrying out intermittent operation. Furthermore, the DC-DC converter according to the present invention can maintain its output ripple voltage constant regardless of the load, and can thus accurately control its output voltage.

A DC-DC converter according to a second aspect of the present invention is characterized in that the current detection circuit according to the first aspect comprises:
an auxiliary switch that turns ON when the low-side switch is ON, and
a compensation circuit that adjusts the current flowing through the auxiliary switch so that the voltages of the low-side switch and the auxiliary switch are equal when the low-side switch and the auxiliary switch are ON.

A DC-DC converter according to a third aspect of the present invention is characterized in that the compensation circuit according to the second aspect comprises:
a differential amplifier to which the voltages of the low-side switch and the auxiliary switch when the low-side switch and the auxiliary switch are ON are input, and
a variable impedance device, connected to the output terminal of the auxiliary switch, the impedance of which changes depending on the output of the differential amplifier.

A DC-DC converter according to a fourth aspect of the present invention is characterized in that the low-side switch and the auxiliary switch according to the second aspect are N-channel FETs.

A DC-DC converter according to a fifth aspect of the present invention is characterized in that the current detection circuit according to the first aspect comprises:
an auxiliary switch that turns ON when the low-side switch is ON,
an offset voltage source that generates an offset voltage, and
a compensation circuit that adjusts the current flowing through the auxiliary switch so that the voltage obtained by adding the offset voltage to the voltage of the low-side switch when the low-side switch is ON becomes equal to the voltage of the auxiliary switch when the auxiliary switch is ON.

A DC-DC converter according to a sixth aspect of the present invention is characterized in that the compensation circuit according to the fifth aspect comprises:
a differential amplifier to which the voltage obtained by adding the offset voltage to the voltage of the low-side switch when the low-side switch is ON and the voltage of the auxiliary switch when the auxiliary switch is ON are input, and
a variable impedance device, connected to the output terminal of the auxiliary switch, the impedance of which changes depending on the output of the differential amplifier.

A DC-DC converter according to a seventh aspect of the present invention is characterized in that the low-side switch and the auxiliary switch according to the fifth aspect are N-channel FETs, and that the offset voltage source is an N-channel FET through which a constant current flows when the N-channel FET is ON.

A DC-DC converter according to an eighth aspect of the present invention comprises:
a high-side switch connected to the power supply voltage side,
a low-side switch connected to the ground side,
an inductor, one terminal of which is connected to the connection point of the high-side switch and the low-side switch connected in series,
an output filter, one terminal of which is connected to the other terminal of the inductor, and the other terminal of which is grounded,
a current detection circuit that detects the current flowing to the inductor via the low-side switch when the low-side switch is ON by detecting and amplifying the voltage drop due to the ON resistance of the low-side switch, and outputs a voltage-converted current detection signal,
a latch circuit that is connected so that the high-side switch and the low-side switch are respectively turned ON/OFF complementarily,
an error amplifier, to one terminal of which a reference voltage is input, to the other terminal of which the output voltage of the converter is input, and which outputs an error signal,
a comparator, to one terminal of which the error signal of the error amplifier is input, to the other terminal of which the current detection signal is input, and which outputs a set signal for setting the latch circuit, and
a timer circuit that outputs a reset signal to the latch circuit after a predetermined time has passed after the high-side switch was turned ON.

A DC-DC converter according to a ninth aspect of the present, invention is characterized in that the current detection circuit according to the eighth aspect comprises:
a first switch formed of an N-channel FET being the same as the low-side switch, and the drain and the gate of which are common to those of the low-side switch, respectively,
a second switch formed of an NPN transistor, the emitter of which is connected to the source of the first switch,
a third switch formed of an NPN transistor, the collector and the base of which are connected to the base of the second switch so as to form a mirror circuit, and the emitter of which is connected to the source of the low-side switch,
a current source that supplies a current to the third switch,
a fourth switch formed of a PNP transistor and a fifth switch formed of a PNP transistor connected so as to form a mirror circuit, which is connected to the collector of the second switch and in which a current being equal to the current flowing through the second switch flows,
a resistor, to one terminal of which the reference voltage is applied, and which converts the current flowing through the fifth switch into a voltage,
an auxiliary switch formed of an N-channel FET, the gate and the source of which are common to those of the low-side switch, respectively,
a differential amplifier, the noninverting input terminal of which is connected to the drain of the low-side switch, and the inverting input terminal of which is connected to the drain of the auxiliary switch, and
a variable impedance device formed of an N-channel FET, the gate of which is connected to the output of the differential amplifier, the drain of which is connected to the other terminal of the resistor, and the source of which is connected to the drain of the auxiliary switch.

A DC-DC converter according to a tenth aspect of the present invention is characterized in that the size of each of the first switch and the auxiliary switch according to the ninth aspect is 1/n of that of the low-side switch, and that the ON resistance thereof is set to n times that of the low-side switch.

A DC-DC converter according to an 11th aspect of the present invention is characterized in that the current detection circuit according to the eighth aspect comprises:
- a resistor, to one terminal of which the reference voltage is applied,
- an auxiliary switch formed of an N-channel FET, the gate and the source of which are common to those of the low-side switch formed of an N-channel FET, respectively,
- a differential amplifier, the inverting input terminal of which is connected to the drain of the auxiliary switch,
- a variable impedance device formed of an N-channel FET, the gate of which is connected to the output of the differential amplifier, the drain of which is connected to the other terminal of the resistor, and the source of which is connected to the drain of the auxiliary switch, and
- an offset voltage source that adds an offset voltage to the drain of the low-side switch and applies the obtained voltage to the noninverting input terminal of the differential amplifier.

A DC-DC converter according to a 12th aspect of the present invention is characterized in that the size of the auxiliary switch according to the 11th aspect is 1/n of that of the low-side switch, and that the ON resistance thereof is set to n times that of the low-side switch.

According to the present invention configured as described above, the DC-DC converter that conforms to the current mode control system and controls the valley value of the inductor current for output control, that is, the OFF time of the high-side FET, is configured so as to be capable of detecting and controlling both the bidirectional currents flowing through the low-side FET. Hence, the present invention can provide a DC-DC converter that continuously detects the inductor current in the whole load range from full load to no load.

Furthermore, in the DC-DC converter according to the present invention, because the output ripple voltage is constant regardless of the load, the output voltage can be controlled accurately even when the load is light.

Still further, because the DC-DC converter according to the present invention is configured to detect and control both the bidirectional currents flowing through the low-side FET, the output voltage having been raised owing to abrupt decrease in load or the like can be returned to a target value quickly by regenerating power to the input.

Moreover, in the DC-DC converter according to the present invention, the current flowing through the low-side FET is detected and controlled in a direction opposite to the direction obtained during ordinary operation only when the output voltage rises abnormally. Therefore, the output voltage having been raised owing to abrupt decrease in load or the like can be returned to the target value quickly by regenerating power to the input, without lowering the efficiency when the load is light.

DETAILED DESCRIPTION OF THE PREFERRED EMBODIMENTS

Preferred embodiments of a DC-DC converter according to the present invention will be described below referring to the accompanying drawings.

Embodiment 1

Figure 1:
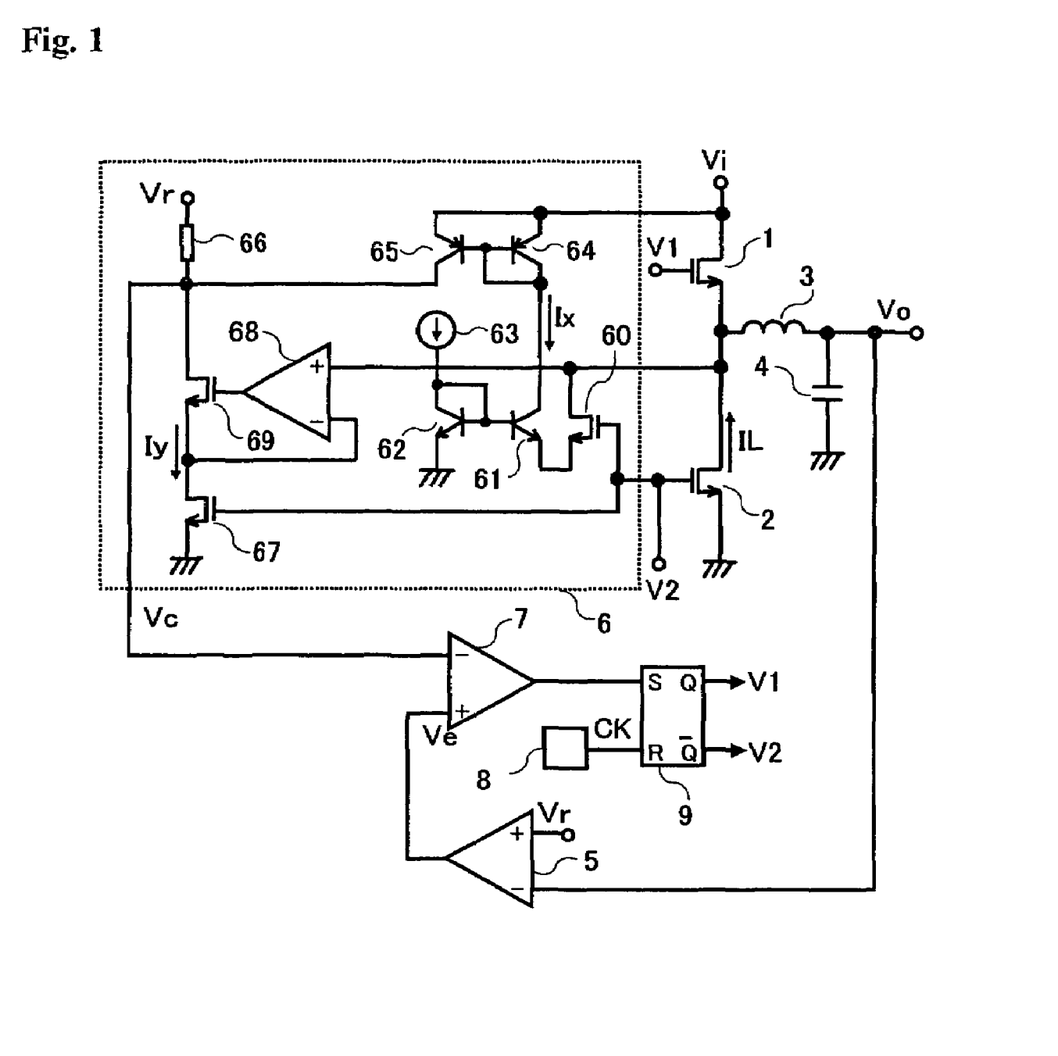
FIG. 1 is a circuit diagram showing the configuration of a DC-DC converter according to Embodiment 1 of the present invention.

FIG. 1 is a circuit diagram showing the configuration of a DC-DC converter according to Embodiment 1 of the present invention. In FIG. 1, Vi designates an input voltage, Vr designates a reference voltage, and Vo designates an output voltage. Between the input voltage Vi and the ground potential, a high-side FET 1 serving as a switching device on the power supply voltage side and a low-side FET 2 serving as a switching device on the ground side are connected in series. A filter comprising an inductor 3 and an output capacitor 4 serving as an output filter is connected to the connection point of these switching devices. The voltage across the terminals of the output capacitor 4 is output as the output voltage Vo.

The DC-DC converter according to Embodiment 1 comprises an error amplifier 5, a current detection circuit 6, a comparator 7, a timer circuit 8, and an RS latch 9. The high-side FET 1 and the low-side FET 2 are connected to the RS latch 9 so as to respectively turn ON/OFF complementarily. The reference voltage Vr is input to the noninverting input terminal (+) of the error amplifier 5, and the output voltage Vo is input to the inverting input terminal (−) thereof, and the error amplifier 5 outputs an error signal Ve. The error signal Ve being output from the error amplifier 5 is input to the noninverting input terminal (+) of the comparator 7, and comparator 7 outputs a set signal S for setting the RS latch 9. The current detection circuit 6 detects the current flowing to the inductor 3 via the low-side FET 2 when the low-side FET 2 is ON by detecting and amplifying the voltage drop due to the ON resistance of the low-side switch, and carries out voltage conversion. The current detection circuit 6 generates a current detection signal Vc being voltage-converted as described above and outputs the signal to the comparator 7. The current detection signal Vc is applied to the inverting input terminal (−) of the comparator 7.

The output terminal of the timer circuit 8 is connected to the reset input terminal (R) of the RS latch 9. A reset signal CK is output after a predetermined time has passed after the high-side FET 1 was turned ON. The current detection circuit 6 comprises an FET 60, which is an N-channel FET being the same as the low-side FET 2, and the drain and the gate of which are common to those of the low-side FET 2, respectively; an NPN transistor 61, the emitter of which is connected to the source of this FET 60; an NPN transistor 62, the collector and the base of which are connected to the base of this NPN transistor 61 so as to form a mirror circuit, and the emitter of which is connected to the source of the low-side FET 2; and a current source 63 that supplies a current to this NPN transistor 62. The current detection circuit 6 further comprises a PNP transistor 64 and a PNP transistor 65 connected so as to form a mirror circuit, which is connected to the collector of the NPN transistor 61 and in which a current being equal to the current flowing through the NPN transistor 61 flows; a resistor 66, to one terminal of which the reference voltage Vr is applied and which converts the current flowing through the PNP transistor 65 into a voltage; and an N-channel FET 67 serving as an auxiliary switch, the gate and the source of which are common to those of the low-side FET 2, respectively. The current detection circuit 6 still further comprises a differential amplifier 68, the noninverting input terminal of which is connected to the drain of the low-side FET 2, and the inverting input terminal of which is connected to the drain of the FET 67; and an N-channel FET 69, the gate of which is connected to the output of the differential amplifier 68, the drain of which is connected to the other terminal of the resistor 66, and the source of which is connected to the drain of the FET 67. The differential amplifier 68 and the N-channel FET 69 form a compensation circuit. The size of each of the FET 60 and the FET 67 is 1/n of that of the low-side FET 2, and the ON resistance thereof is n times that of the low-side FET 2. Herein, "n" is a positive value, and is set to a predetermined value according to the device to be used. Furthermore, the N-channel FET 60 serves as a first switch, the NPN transistor 61 serves as a second switch, the NPN transistor 62 serves as a third switch, the PNP transistor 64 serves as a fourth switch, and the PNP transistor 65 serves as a fifth switch. Still further, the N-channel FET 69 of the compensation circuit is a variable impedance device, the impedance of which changes depending on the output of the differential amplifier 68.

The basic operations of the DC-DC converter according to Embodiment 1 of the present invention, shown in FIG. 1, will be described below.

When the high-side FET 1 is ON, the voltage difference (Vi−Vo) between the input voltage Vi and the output voltage Vo is applied to the inductor 3. At this time, the current IL flowing through the inductor 3 increases linearly, and magnetic energy is stored in the inductor 3. When the high-side FET 1 is OFF, the output voltage Vo is applied to the inductor 3 in the opposite direction. At this time, the inductor current IL decreases linearly, and the inductor 3 releases the magnetic energy. The inductor current IL is smoothened using the output capacitor 4, and a smoothened DC current is supplied to the output terminal. The output voltage Vo is fed back to the inverting input terminal (−) of the error amplifier 5. On the other hand, the reference voltage Vr is input to the noninverting input terminal (+) of the error amplifier 5. The error signal Ve being output from the error amplifier 5 is input to the noninverting input terminal (+) of the comparator 7. The current detection signal Vc obtained by subjecting the current flowing through the low-side FET 2 to current-voltage conversion is input to the inverting input terminal (−) of the comparator 7. When the inductor current IL decreases, and when the current detection signal Vc lowers to the error signal Ve being output from the error amplifier 5, the output of the comparator 7 is inverted. In other words, the set signal S being input to the RS latch 9 becomes high, and the high-side FET 1 is turned ON. Then, the inductor 3 is begun to be charged. The timer circuit 8 that sets the ON time of the high-side FET 1 is connected to the reset input terminal (R) of the RS latch 9. After a predetermined time has passed after the set signal S being output from the comparator 7 became high and after the high-side FET 1 was turned ON, the timer circuit 8 outputs a reset signal CK, thereby turning OFF the high-side FET 1.

In the DC-DC converter according to Embodiment 1 configured as described above, the high-side FET 1 and the low-side FET 2 are turned ON/OFF complementarily using the respective signals of the error amplifier 5, the comparator 7 and the RS latch 9 as described above, and the predetermined DC output voltage Vo is output.

The above-mentioned operations are the basic operations of the respective components of the DC-DC converter according to Embodiment 1. Operations when the load changes abruptly will be described next.

For example, when the output voltage Vo becomes lower than a target value because of the increase in the output current Io from the output terminal, the error amplifier 5 detects the lowering of the output voltage Vo and raises the error signal Ve. As a result, the time during which the current detection signal Vc of the low-side FET 2 lowers and reaches the error signal Ve, that is, the OFF time of the high-side FET 1, becomes shorter. Because the ON time of the high-side FET 1, being set using the timer circuit 8, is constant, the inductor current IL increases wholly. Hence, the power supplied to the output capacitor 4 increases, and the output voltage Vo having been lowered is raised.

In the opposite case, that is, when the output voltage Vo rises because of the decrease in the output current Io, the error amplifier 5 lowers the error signal Ve. Hence, the time during which the current detection signal Vc of the low-side FET 2 reaches the error signal Ve, that is, the OFF time of the high-side FET 1, becomes longer. Because the ON time of the high-side FET 1, being set using the timer circuit 8, is constant, the inductor current IL decreases wholly. Hence, the power supplied to the output capacitor 4 decreases, and the output voltage Vo having been raised is lowered. As described above, the DC-DC converter according to Embodiment 1 operates so that the output voltage Vo is maintained at a predetermined value.

The operation of the current detection circuit 6 that detects the current of the low-side FET 2 in the DC-DC converter according to Embodiment 1 will be described below.

First, in the case that the current IL flows from the source to the drain of the low-side FET 2 (IL≧0), the potential at the source of the FET 60 and the emitter of the NPN transistor 61 becomes equal to the potential at the source of the low-side FET 2 because the NPN transistor 61 and the NPN transistor 62 form a mirror circuit. Hence, the voltage across the source and the drain of the FET 60 becomes equal to the voltage across the source and the drain of the low-side FET 2. In addition, because the ON resistance of the FET 60 is n times the ON resistance of the low-side FET 2, when it is assumed that the current flowing through the low-side FET 2 is IL when the low-side FET 2 is ON, the current Ix flowing through the FET 60 is IL/n. The current Ix flows through the resistor 66 via the NPN transistor 61, the PNP transistor 64 and the PNP transistor 65. When it is assumed that the resistance value of the resistor 66 is Rs, a voltage (Rs×IL/n) is generated across the terminals of the resistor 66. In other words, the current detection signal Vc is represented by the following expression (1). Furthermore, because the current Ix does not flow in the opposite direction, that is, Ix≧0, the condition of IL≧0 is attached.

$$Vc = Vr + Rs \times IL/n \, (IL \geq 0) \quad (1)$$

Next, in the case that the current IL flows from the drain to the source of the low-side FET 2 (IL≦0), a voltage (−IL×Ron) is generated at the drain using the ON resistance of the low-side FET 2. This voltage is applied to the noninverting input terminal (+) of the differential amplifier 68. The differential amplifier 68 controls the FET 69 to adjust the current Iy flowing from the FET 69 to the FET 67 so that the voltage applied to the inverting input terminal (−) becomes equal to the above-mentioned voltage (−IL×Ron). Because the ON resistance of the FET 67 serving as an auxiliary switch is n times the ON resistance of the low-side FET 2, the following expression (2) is established.

$$Iy \times Ron \times n = -IL \times Ron \quad (2)$$

Because the current Iy is represented by Iy=−IL/n according to the expression (2), the current detection signal Vc is represented by the following expression (3). Furthermore, because the current Iy does not flow in the opposite direction, that is, Iy≧0, the condition of IL≦0 is attached.

$$Vc = Vr + Rs \times IL/n (Ix \leq 0) \quad (3)$$

Accordingly, the current detection signal Vc is represented by the following expression (4), regardless of whether the current IL of the low-side FET 2 is positive or negative.

$$Vc = Vr + Rs \times IL/n \quad (4)$$

Hence, in the DC-DC converter according to Embodiment 1, the detection and control can be carried out even when the valley value of the inductor current is less than zero.

Figures 2A, 2B, 2C:
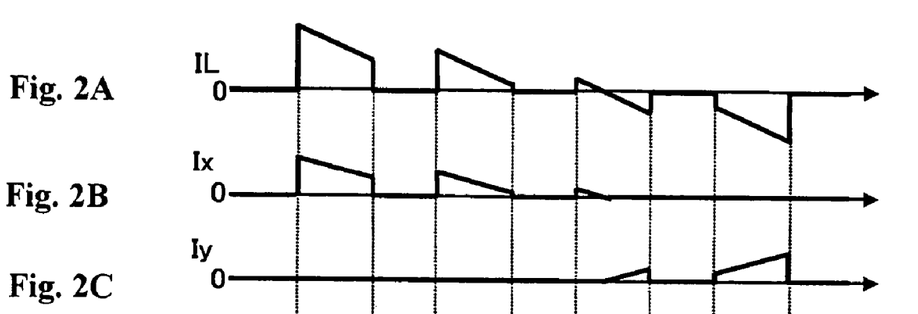
FIGS. 2A to 2H are waveform diagrams showing the operations in the DC-DC converter according to Embodiment 1 of the present invention.
Figure 2D:
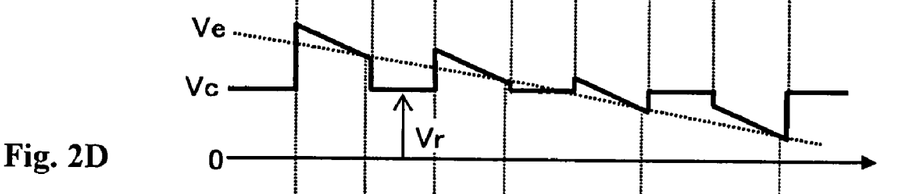
Figure 2E:
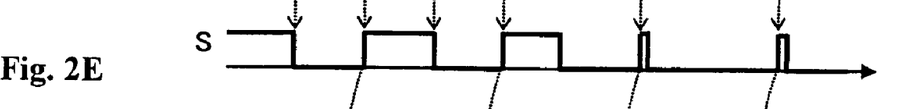
Figure 2F:
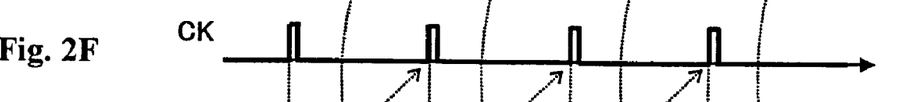
Figure 2G:
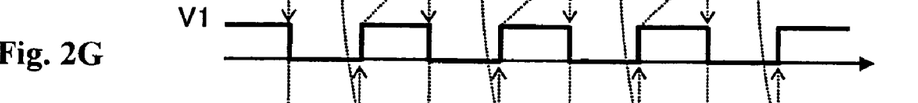
Figure 2H:
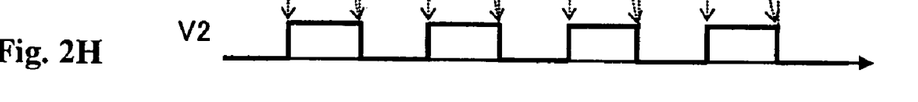

FIGS. 2A to 2H are waveform diagrams showing the operations of the respective components in the DC-DC converter according to Embodiment 1 of the present invention shown in FIG. 1. FIG. 2A shows the current IL flowing through the low-side FET 2; FIG. 2B shows the current Ix flowing through the FET 60; FIG. 2C shows the current Iy flowing through the FET 67; FIG. 2D shows the current detection signal Vc and the error signal Ve; FIG. 2E shows the set signal S of the RS latch 9; FIG. 2F shows the clock signal CK that is output from the timer circuit 8 and serves as the reset signal for the RS latch 9; FIG. 2G shows the output signal V1 of the RS latch 9, serving as a driving signal applied to the high-side FET 1; and FIG. 2H shows the output signal V2 of the RS latch 9, serving as a driving signal applied to the high-side FET 2. As the error signal Ve changes from a value higher than the reference voltage Vr to a lower value, the threshold value of the current according to which the low-side FET 2 is turned OFF changes from a positive value to a negative value. Hence, in the DC-DC converter according to Embodiment 1, the control can be carried out even when the valley value of the inductor current is negative. For this reason, intermittent operation is not necessary even when the output current of the DC-DC converter becomes zero, and the continuation state of the inductor current can be maintained. Furthermore, even when the output voltage rises owing to abrupt decrease in load, the inductor current flows in the opposite direction. In other words, the output voltage can be lowered quickly to the target value by regenerating power from the output to the input.

Embodiment 2

Figure 3:
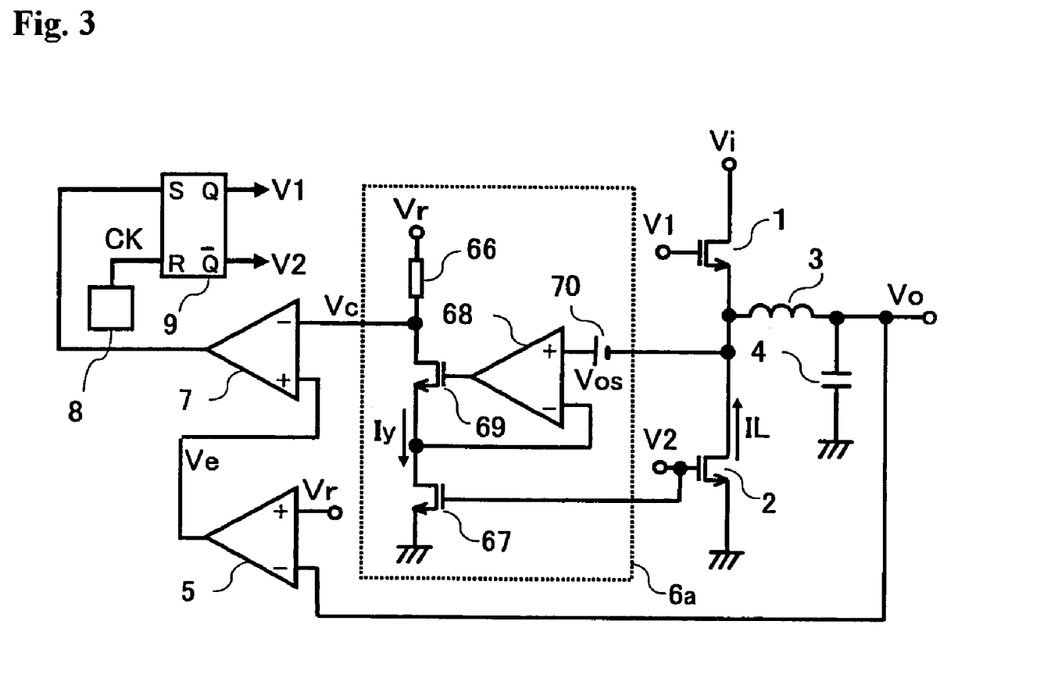
FIG. 3 is a circuit diagram showing the configuration of a DC-DC converter according to Embodiment 2 of the present invention.

FIG. 3 is a circuit diagram showing the configuration of a DC-DC converter according to Embodiment 2 of the present invention. In FIG. 3, the components having the same functions and configurations as those of the components in the DC-DC converter according to Embodiment 1 of the present invention shown in FIG. 1 are designated by the same numerals, and their descriptions are incorporated in the descriptions in Embodiment 1.

The DC-DC converter according to Embodiment 2 differs from the DC-DC converter according to Embodiment 1 shown in FIG. 1 in the configuration of the current detection circuit. The current detection circuit according to Embodiment 2 is designated by numeral 6a so as to be distinguished from the current detection circuit 6 shown in FIG. 1.

The configuration and operation of the current detection circuit 6a in the DC-DC converter according to Embodiment 2 will be described below.

The current detection circuit 6a in the DC-DC converter according to Embodiment 2 comprises a resistor 66, to one terminal of which the reference voltage Vr is applied; an N-channel FET 67, the gate and the source of which are common to those of the low-side FET 2, respectively; a differential amplifier 68, the inverting input terminal (−) of which is connected to the drain of the FET 67; an N-channel FET 69, the gate of which is connected to the output of the differential amplifier 68, the drain of which is connected to the other terminal of the resistor 66, and the source of which is connected to the drain of the FET 67; and an offset voltage source 70 that adds an offset voltage Vos to the drain of the low-side FET 2 and applies the obtained voltage to the noninverting input terminal (+) of the differential amplifier 68. The size of the FET 67 serving as an auxiliary switch is 1/n of that of the low-side FET 2, and the ON resistance thereof is n times that of the low-side FET 2. The voltage at the connection point of the resistor 66 and the drain of the FET 69 is output as the current detection signal Vc, and applied to the inverting input terminal (−) of the comparator 7.

The current IL flowing from the source to the drain of the low-side FET 2 generates a voltage (−IL×Ron) using the ON resistance Ron of the low-side FET 2. The voltage (Vos−IL×Ron), obtained by adding the offset voltage Vos to the voltage generated at the drain of the low-side FET 2, is applied to the noninverting input terminal (+) of the differential amplifier 68. The differential amplifier 68 controls the FET 69 to adjust the current Iy flowing from the FET 69 to the FET 67 so that the voltage applied to the inverting input terminal (−) of the differential amplifier 68 becomes equal to the voltage (Vos−IL×Ron) having been input to the noninverting input terminal (+). Because the ON resistance of the FET 67 is (n×Ron), the following expression (5) is established.

$$Iy \times n \times Ron = Vos - IL \times Ron \quad (5)$$

According to the expression (5), the current Iy is represented by the following expression (6).

$$Iy = (Vos/Ron - IL)/n \quad (6)$$

Hence, when it is assumed that the resistance value of the resistor 66 is Rs, the current detection signal Vc being output from the current detection circuit 6a is represented by the following expression (7).

$$\begin{aligned} Vc &= Vr - Rs \times Iy \\ &= Vr - Rs \times (Vos/Ron - IL)/n \end{aligned} \quad (7)$$

Figure 4A:
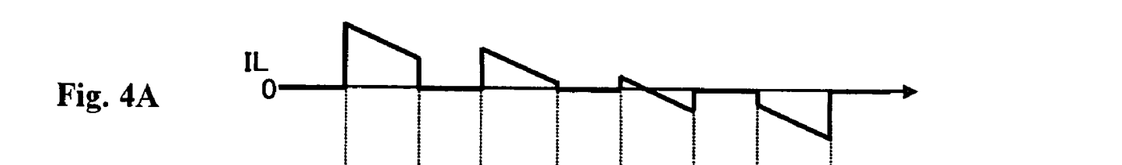
FIGS. 4A to 4G are waveform diagrams showing the operations in the DC-DC converter according to Embodiment 2 of the present invention.
Figure 4B:
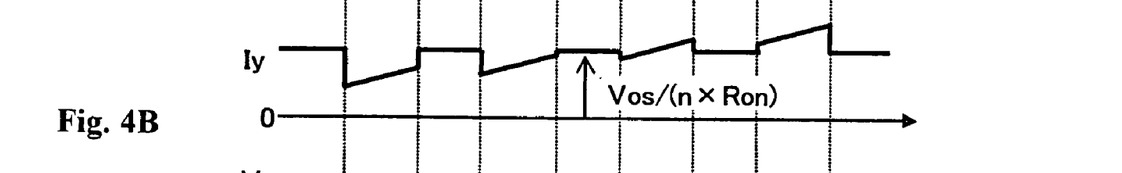
Figure 4C:
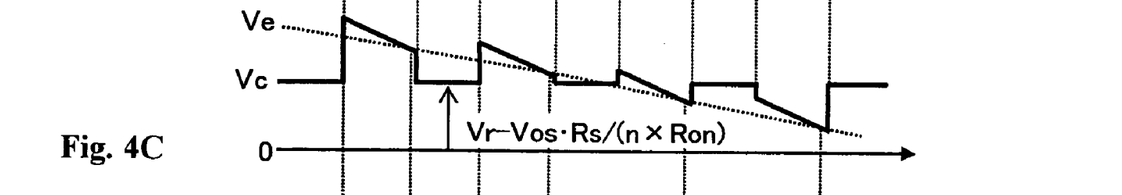
Figure 4D:
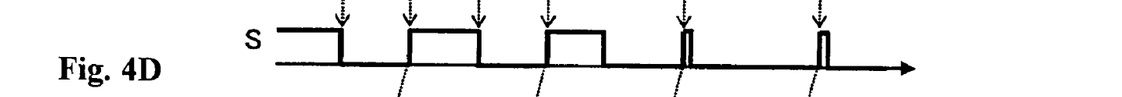
Figure 4E:
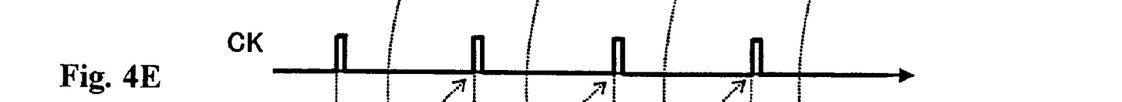
Figures 4F, 4G:
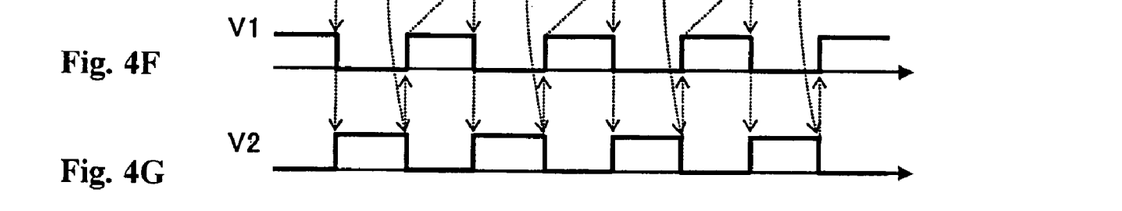

FIGS. 4A to 4G are waveform diagrams showing the operations of the respective components in the DC-DC converter according to Embodiment 2 of the present invention shown in FIG. 3. FIG. 4A shows the current IL flowing through the low-side FET 2; FIG. 4B shows the current Iy flowing through the FET 67; FIG. 4C shows the current detection signal Vc and the error signal Ve; FIG. 4D shows the set signal S that is input to the set terminal of the RS latch 9; FIG. 4E shows the clock signal CK that is output from the timer circuit 8 and serves as the reset signal for the RS latch 9; FIG. 4F shows the output signal V1 of the RS latch 9, serving as a driving signal applied to the high-side FET 1; and FIG. 4G shows the output signal V2 of the RS latch 9, serving as a driving signal applied to the high-side FET 2. As the error signal Ve changes from a value higher than the voltage (Vr−Vos×Rs/(n×Ron)) to a lower value, the threshold value of the current according to which the low-side FET 2 is turned OFF changes from a positive value to a negative value. Hence, in the DC-DC converter according to Embodiment 2, the control can be carried out even when the valley value of the inductor current is negative. For this reason, intermittent operation is not necessary even when the output current of the DC-DC converter becomes zero, and the continuation state of the inductor current can be maintained.

Furthermore, in the DC-DC converter according to Embodiment 2, even when the output voltage rises owing to abrupt decrease in load, the inductor current flows in the opposite direction. In other words, the output voltage can be lowered quickly to the target value by regenerating power from the output to the input.

Figure 5:
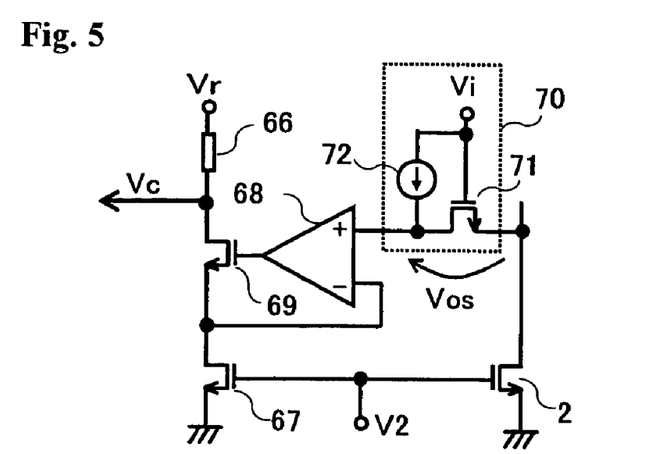
FIG. 5 is a circuit example of an offset voltage source 70 in the DC-DC converter according to Embodiment 2 of the present invention.

Still further, as shown in FIG. 5, the current detection circuit 6a in the DC-DC converter according to Embodiment 2 may also be configured so that an N-channel FET 71, similar to the low-side FET 2 and the FET 67, is turned ON and is used as a resistor device, and a constant current is passed through this resistor device 71 using a current source 72 so as to serve as the offset voltage source 70. With this configuration, it is possible to eliminate the influences of the temperature characteristics and performance variation of the ON resistance by cancellation.

Besides, it is also possible that the conventional intermittent operation not allowing any reverse current flow in the low-side FET 2 is carried out during ordinary operation to improve the efficiency at the time when the load is light, and that the current IL flowing through the low-side FET 2 is detected and controlled in a direction opposite to the direction obtained during ordinary operation only when the output voltage rises abnormally. For example, the current detection signal Vc is compared with a predetermined value Vx different from the error signal Ve. In the case of Ve<Vx, when the current detection signal Vc becomes lower than the predetermined value Vx, the driving signal V2 applied to the low-side FET 2 becomes low, and the low-side FET 2 is turned OFF. With the setting of Vx=Vr−Vos×Rs/(n×Ron), when the current IL flowing through the low-side FET 2 becomes zero, the low-side FET 2 is turned OFF, and no reverse current flows. As a result, the output voltage Vo rises when the load is light. Hence, the OFF state of the high-side FET 1 is maintained, the fact that the output voltage has lowered to the target value is detected, and the high-side FET 1 is turned ON. This technology is not detailed herein because the technology is similar to that used in the conventional DC-DC converter, except that the reverse current flow in the low-side FET 2 is not allowed by the adjustment of the predetermined value Vx. When the fact that the output voltage Vo has exceeded the target value by an allowable value or more is detected, the predetermined value Vx is lowered. Hence, the reverse flow of the inductor current is allowed, and power is regenerated from the output to the input. As a result, the output voltage can be lowered quickly to the target value. The error amplifier 5 may be used or a detection circuit that monitors the output voltage Vo may be provided separately to detect the fact that the output voltage Vo has exceeded the target value by the allowable value or more.

As described above, the present invention is useful for a DC-DC converter that comprises switches and an inductor and controls DC power supplied to a load by controlling the valley value of the inductor current while periodically increasing/decreasing the inductor current by switching operation.

What is claimed is:

1. A DC-DC converter comprising:
   a high-side switch connected to the power supply voltage side,
   a low-side switch being used for rectification and connected to the ground side,
   an inductor, one terminal of which is connected to the connection point of said high-side switch and said low-side switch connected in series,
   an output filter, one terminal of which is connected to the other terminal of said inductor, and the other terminal of which is grounded, and
   a current detection circuit that detects the current flowing through said low-side switch, wherein
   said DC-DC converter is configured to adjust the current flowing through said low-side switch and to control the output voltage being output from said output filter by turning ON/OFF said high-side switch and said low-side switch;
   said current detection circuit is configured to detect current flowing through said low-side switch in both a first direction and a second direction when said low-side switch is ON; and
   said current detection circuit comprises:
   an auxiliary switch that turns ON when said low-side switch is ON, and
   a compensation circuit that adjusts the current flowing through said auxiliary switch so that the voltages of said low-side switch and said auxiliary switch are equal when said low-side switch and said auxiliary switch are ON.

2. The DC-DC converter according to claim 1, wherein said compensation circuit comprises:
   a differential amplifier to which the voltages of said low-side switch and said auxiliary switch when said low-side switch and said auxiliary switch are ON are input, and
   a variable impedance device, connected to the output terminal of said auxiliary switch, the impedance of which changes depending on the output of said differential amplifier.

3. The DC-DC converter according to claim 1, wherein said low-side switch and said auxiliary switch are N-channel FETs.

4. A DC-DC converter comprising:
   a high-side switch connected to the power supply voltage side,
   a low-side switch being used for rectification and connected to the around side,
   an inductor, one terminal of which is connected to the connection point of said high-side switch and said low-side switch connected in series,
   an output filter, one terminal of which is connected to the other terminal of said inductor, and the other terminal of which is grounded, and
   a current detection circuit that detects the current flowing through said low-side switch, wherein
   said DC-DC converter is configured to adjust the current flowing through said low-side switch and to control the output voltage being output from said output filter by turning ON/OFF said high-side switch and said low-side switch,
   said current detection circuit is configured to detect current flowing through said low-side switch in both a first direction and a second direction when said low-side switch is ON, and
   said current detection circuit comprises
   an auxiliary switch that turns ON when said low-side switch is ON, an offset voltage source that generates an offset voltage, and a compensation circuit that adjusts the current flowing through said auxiliary switch so that the voltage obtained by adding said offset voltage to the voltage of said low-side switch when said low-side switch is ON becomes equal to the voltage of said auxiliary switch when said auxiliary switch is ON.

5. The DC-DC converter according to claim 4, wherein said compensation circuit comprises:

a differential amplifier to which the voltage obtained by adding said offset voltage to the voltage of said low-side switch when said low-side switch is ON and the voltage of said auxiliary switch when said auxiliary switch is ON are input, and a variable impedance device, connected to the output terminal of said auxiliary switch, the impedance of which changes depending on the output of said differential amplifier.

6. The DC-DC converter according to claim 4, wherein said low-side switch and said auxiliary switch are N-channel FETs, and said offset voltage source is an N-channel FET through which a constant current flows when said N-channel FET is ON.

7. A DC-DC converter comprising:

a high-side switch connected to the power supply voltage side, a low-side switch connected to the ground side, an inductor, one terminal of which is connected to the connection point of said high-side switch and said low-side switch connected in series, an output filter, one terminal of which is connected to the other terminal of said inductor, and the other terminal of which is grounded, a current detection circuit that detects the current flowing to said inductor via said low-side switch when said low-side switch is ON by detecting and amplifying the voltage drop due to the ON resistance of said low-side switch, and outputs a voltage-converted current detection signal, a latch circuit that is connected so that said high-side switch and said low-side switch are respectively turned ON/OFF complementarily, an error amplifier, to one terminal of which a reference voltage is input, to the other terminal of which the output voltage of said converter is input, and which outputs an error signal, a comparator, to one terminal of which said error signal of said error amplifier is input, to the other terminal of which said current detection signal is input, and which outputs a set signal for setting said latch circuit, and a timer circuit that outputs a reset signal to said latch circuit after a predetermined time has passed after said high-side switch was turned ON.

8. The DC-DC converter according to claim 7, wherein said current detection circuit comprises:

a first switch formed of an N-channel FET being the same as said low-side switch, and the drain and the gate of which are common to those of said low-side switch, respectively, a second switch formed of an NPN transistor, the emitter of which is connected to the source of said first switch, a third switch formed of an NPN transistor, the collector and the base of which are connected to the base of said second switch so as to form a mirror circuit, and the emitter of which is connected to the source of said low-side switch, a current source that supplies a current to said third switch, a fourth switch formed of a PNP transistor and a fifth switch formed of a PNP transistor connected so as to form a mirror circuit, which is connected to the collector of said second switch and in which a current being equal to the current flowing through said second switch flows, a resistor, to one terminal of which the reference voltage is applied, and which converts the current flowing through the fifth switch into a voltage, an auxiliary switch formed of an N-channel FET, the gate and the source of which are common to those of said low-side switch, respectively, a differential amplifier, the noninverting input terminal of which is connected to the drain of said low-side switch, and the inverting input terminal of which is connected to the drain of said auxiliary switch, and a variable impedance device formed of an N-channel FET, the gate of which is connected to the output of said differential amplifier, the drain of which is connected to the other terminal of said resistor, and the source of which is connected to the drain of the auxiliary switch.

9. The DC-DC converter according to claim 8, wherein the size of each of said first switch and said auxiliary switch is 1/n of that of said low-side switch, and the ON resistance thereof is set to n times that of said low-side switch.

10. The DC-DC converter according to claim 7, wherein said current detection circuit comprises:

a resistor, to one terminal of which the reference voltage is applied, an auxiliary switch formed of an N-channel FET, the gate and the source of which are common to those of said low-side switch formed of an N-channel FET, respectively, a differential amplifier, the inverting input terminal of which is connected to the drain of said auxiliary switch, a variable impedance device formed of an N-channel FET, the gate of which is connected to the output of said differential amplifier, the drain of which is connected to the other terminal of said resistor, and the source of which is connected to the drain of said auxiliary switch, and an offset voltage source that adds an offset voltage to the drain of said low-side switch and applies the obtained voltage to the noninverting input terminal of said differential amplifier.

11. The DC-DC converter according to claim 10, wherein the size of said auxiliary switch is 1/n of that of said low-side switch, and the ON resistance thereof is set to n times that of said low-side switch.

* * * * *